(12) United States Patent
Gilomme

(10) Patent No.: US 10,472,010 B2
(45) Date of Patent: Nov. 12, 2019

(54) BICYCLE SECURITY SYSTEM

(71) Applicant: Cadet Gilomme, Miami, FL (US)

(72) Inventor: Cadet Gilomme, Miami, FL (US)

(*) Notice: Subject to any disclaimer, the term of this patent is extended or adjusted under 35 U.S.C. 154(b) by 0 days.

(21) Appl. No.: 16/125,633

(22) Filed: Sep. 7, 2018

(65) Prior Publication Data

US 2019/0023337 A1 Jan. 24, 2019

Related U.S. Application Data

(63) Continuation-in-part of application No. 15/787,622, filed on Oct. 18, 2017, now abandoned.

(60) Provisional application No. 62/409,799, filed on Oct. 18, 2016.

(51) Int. Cl.
*B62H 5/14* (2006.01)
*E05B 47/00* (2006.01)
*E05B 17/10* (2006.01)

(52) U.S. Cl.
CPC .......... *B62H 5/144* (2013.01); *E05B 47/0001* (2013.01); *E05B 17/10* (2013.01); *E05B 2047/0058* (2013.01); *E05B 2047/0095* (2013.01)

(58) Field of Classification Search
CPC ................. B60R 2325/30; Y10T 70/5872
See application file for complete search history.

(56) References Cited

U.S. PATENT DOCUMENTS

| | | | | |
|---|---|---|---|---|
| 5,802,889 A | * | 9/1998 | Arnold ............... | B62H 5/14 211/5 |
| 6,751,992 B1 | * | 6/2004 | Esquilin ............. | B62H 3/02 70/227 |
| 2008/0022735 A1 | * | 1/2008 | Hood .................. | B62H 5/14 70/233 |
| 2009/0178446 A1 | * | 7/2009 | Patterson ........... | B62H 3/04 70/259 |
| 2009/0188285 A1 | * | 7/2009 | Cheng ................ | B62H 1/02 70/233 |
| 2016/0090754 A1 | * | 3/2016 | Mohamed .......... | B62H 5/147 70/15 |

* cited by examiner

*Primary Examiner* — Laura N Nguyen

(74) *Attorney, Agent, or Firm* — Bruce A. Lev

(57) ABSTRACT

A security system for use with bicycles. The security system includes a tube having two tube halves attached to the down tube of a bicycle and includes two movable arms adapted to releasably hold onto an existing structure. An electromagnet is also attached to the tube for releasably attaching to metallic structures. The two arms and electromagnet can be controlled using a remote control fob or cell phone. A surface detection sensor attached to the handlebars of the bicycle is also employed to locate the bicycle in the event of theft.

13 Claims, 6 Drawing Sheets

BICYCLE SECURITY SYSTEM

CROSS-REFERENCE TO RELATED APPLICATION

The present application is related to and claims priority from prior provisional application Ser. No. 62/409,799 filed Oct. 18, 2016, and Ser. No. 15/787,622 filed on Oct. 18, 2017, which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of security systems and more specifically relates to a security system for bicycles.

2. Description of the Related Art

Property crimes are at an all-time high throughout the United States. According to the FBI, there was an estimated 8,277,829 property crimes reported by law enforcement in 2014. This number includes burglaries, larceny-thefts, motor vehicle thefts and bicycle thefts. The financial losses suffered by the victims of these crimes is estimated at around 14.3 billion. Bicycle thefts are particularly on the rise, with an average of 1.5 billion bicycles stolen each year. Due to the consistent popularity of bicycling as a sport and way of transportation, bicycles remain simple targets for thieves. Therefore, a need exists for a specially design better way to protect unattended bicycles.

Various attempts have been made to solve the above-mentioned problems such as those found in U.S. Pat. and Pub. Nos.: U.S. Pat. No. 9,381,964 to Haidak et al; U.S. Pat. No. 9,157,742 to Farner et al; U.S. Publication Number 20160221627 to Hines et al; and U.S. Publication Number 20130150028 to Hines et al. This prior art is representative of security systems for bicycles. None of the above inventions and patents, taken either singly or in combination, is seen to describe the invention as claimed.

Ideally, a bicycle security system should provide a means to secure a bicycle from theft and, yet would operate reliably and be manufactured at a modest expense. Thus, a need exists for a reliable bicycle system to avoid the above-mentioned problems.

BRIEF SUMMARY OF THE INVENTION

In view of the foregoing disadvantages inherent in the known art, the present invention provides a novel Bicycle Security System. The general purpose of the present invention, will be described subsequently in greater detail. The features of the invention which are believed to be novel are particularly pointed out and distinctly claimed in the concluding portion of the specification. These and other features, aspects, and advantages of the present invention will become better understood with reference to the following drawings and detailed description.

The Bicycle Security System of the present invention allows users: to leave their bicycle anywhere without the need to be tethered to an existing stationary support, eliminates the use of chaining systems that are easily cut off, comes equipped with a security system which offers a user peace of mind, and is easily locked and unlocked with a fob-lock system.

The present invention holds significant improvements and serves as a novel Bicycle Security System. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments of use for the present invention. The Bicycle Security System is constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a Security System and more particularly to a Bicycle Security System.

Figure 1:
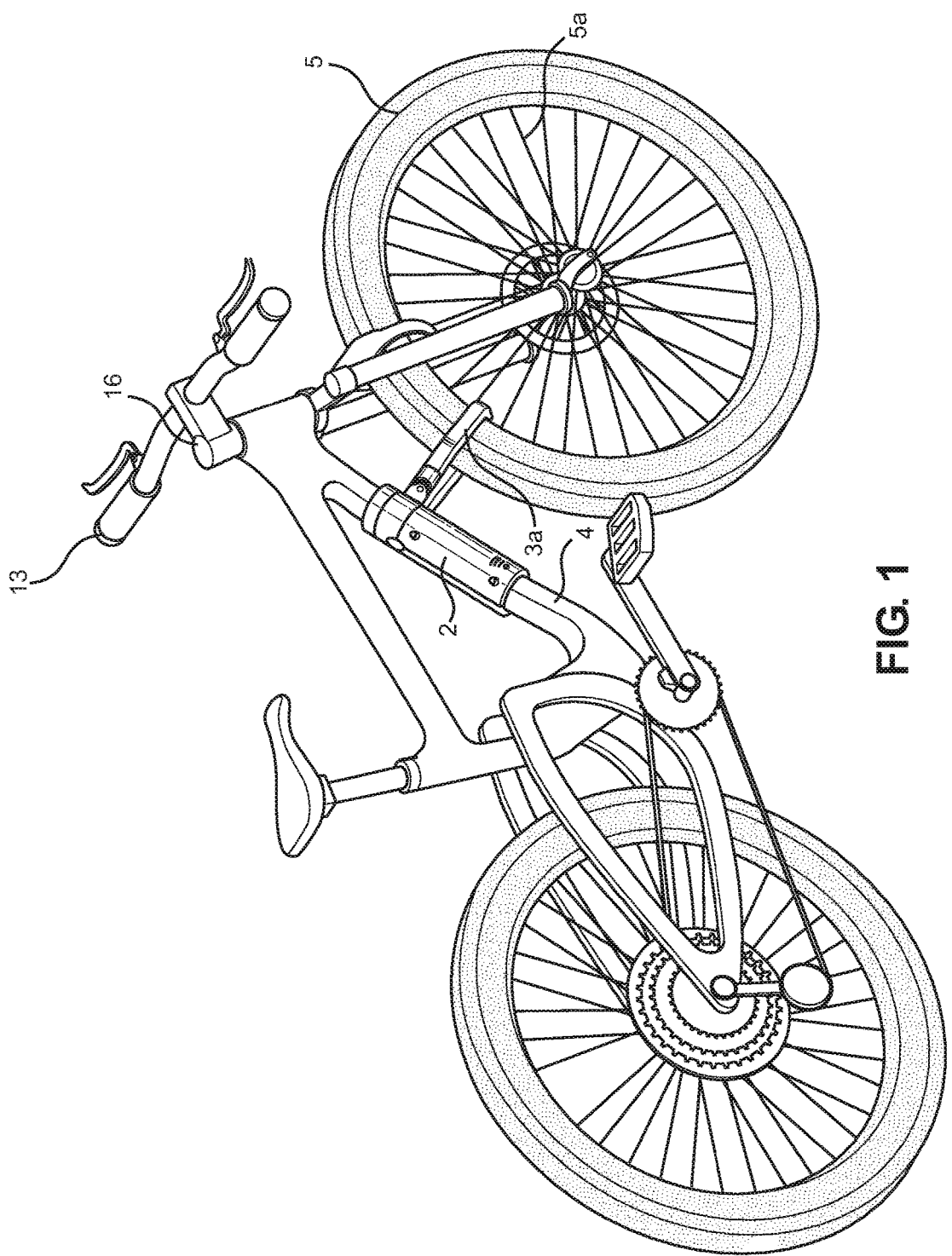
FIG. 1 shows a perspective view illustrating the Bicycle Security System for use with an ordinary bicycle according to an embodiment of the present invention.
Figure 2:
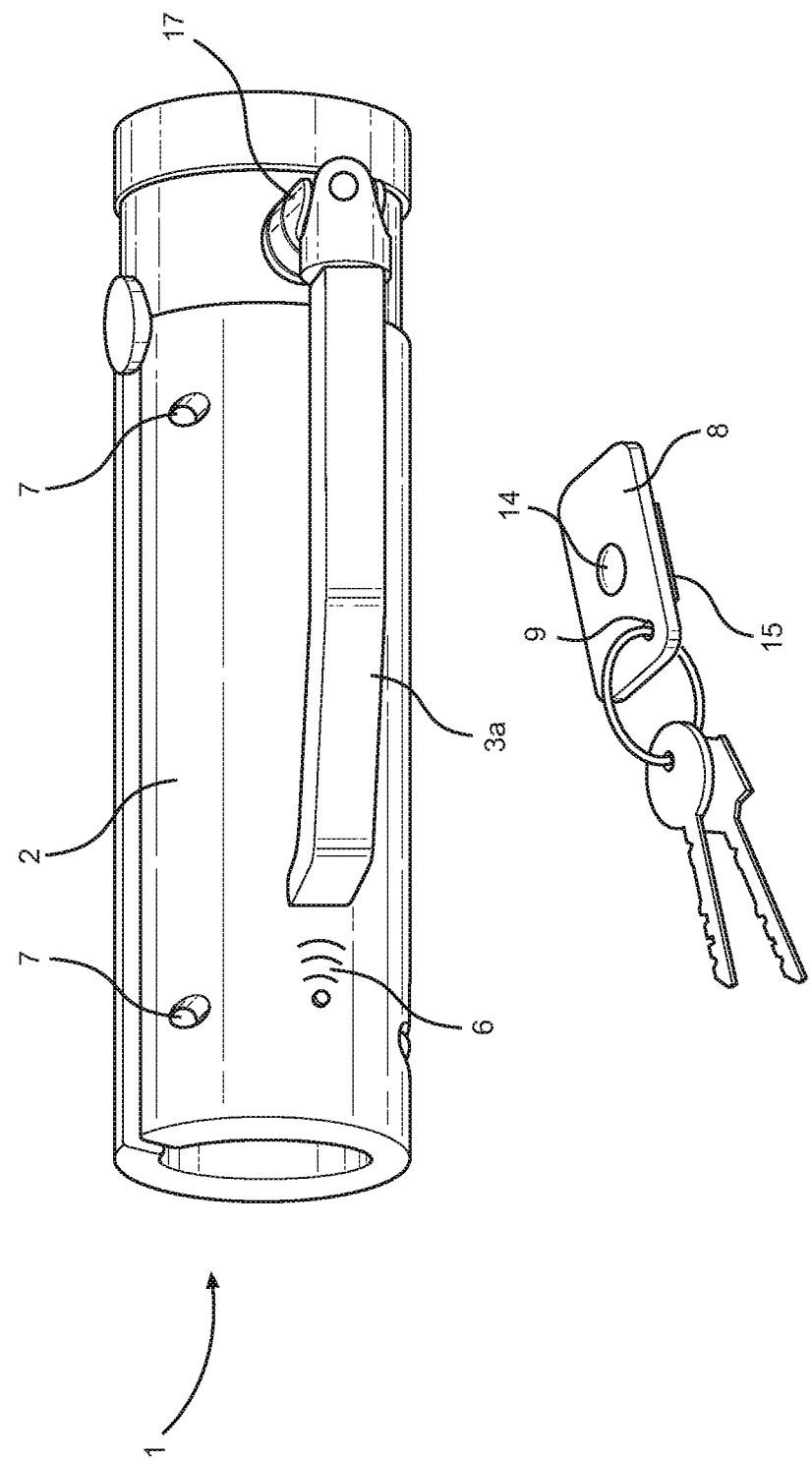
FIG. 2 is a perspective view illustrating a tubular housing and a fob of the Bicycle Security System according to an embodiment of the present invention of FIG. 1.
Figure 3:
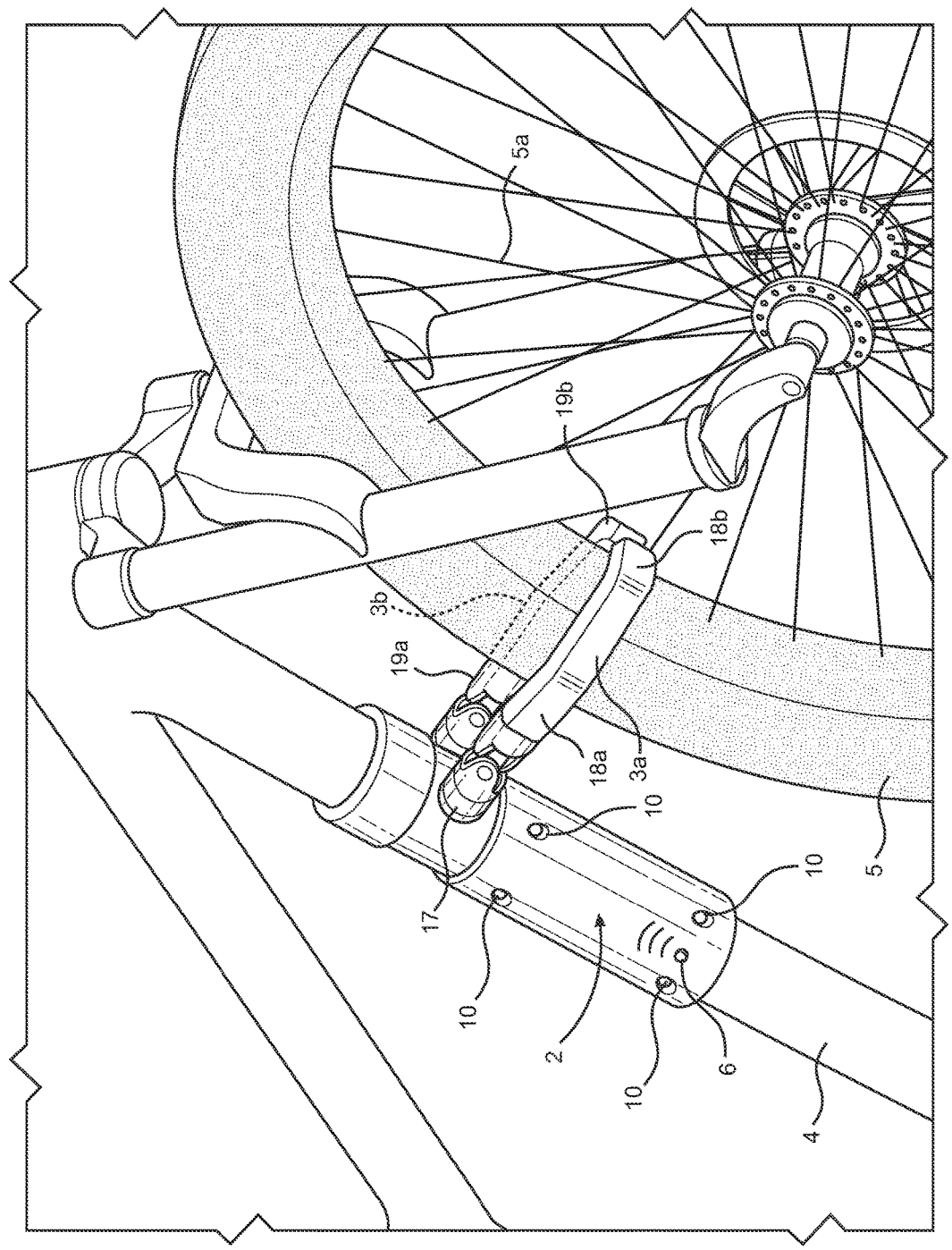
FIG. 3 is a perspective view illustrating a close-up view of the tubular housing of the Bicycle Security System according to an embodiment of the present invention of FIG. 1.

Generally speaking, and shown in FIGS. 1-4, The Bicycle Security System of the present invention is an elite security system to better protect bicycles from theft. It is used with an ordinary bicycle having a down tube 4, a handlebar 13 and a front tire 5 having adjacent spokes 5A. The Bicycle Security System consists of a fob lock system 1, which is a small security hardware device with built-in authentication used to control and secure access to the Bicycle Security System of a particular user. The fob lock system 1 includes a tubular housing 2 which is secured to the down tube 4 of an ordinary bicycle as shown in FIGS. 1 and 3.

The tubular housing 2 is secured to the down tube 4 of a bicycle by conventional mechanical securing pins 10 which extend through holes 7 in the housing 2 and into the down tube 4 in a permanent fixed manner as seen in FIG. 3. The tubular housing 2 has a pair of opposing legs 3A and 3B which assume either a locked position or an unlocked position. When opposing legs 3A and 3B are in a locked position, they firmly secure the front tire 5 of an ordinary bicycle in a stationary position thereby preventing the tire 5 from rotating as best seen in FIGS. 1 and 3.

In the unlocked position, opposing legs 3A and 3B are configured to lie in a plane parallel and adjacent to the tubular housing 2 as shown in FIG. 2. Leg 3A has a first end 18A and a second end 18B. Second end 18B of leg 3A is an inturned hook portion. Leg 3B has a first end 19A and a second end 19B. Second end 19B of leg 3B is also an inturned hook portion.

Opposing legs 3A and 3B are attached to the tubular housing 2 at their first ends 18A and 19A respectively by a conventional universal swivel joint 17 which allows opposing legs 3A and 3B to rotate between a plane parallel to the tubular housing 2 as described above and a plane perpendicular to the tubular housing 2.

The universal swivel joint 17 allows opposing legs 3A and 3B to rotate downwardly to the plane perpendicular to the tubular housing 2 and to further move toward each other to the locked position whereby the hooked portion of second ends 18B and 19B of opposing legs reside between the adjacent spokes 5A of the front tire 5 to produce an interference fit thereby securing the tire 5 in a stationary position as shown in FIG. 3.

The tubular housing 2 includes a first sensor 6 employing a receiver configured to receive a first signal to actuate opposing legs 3A and 3B into either a locked position or an unlocked position.

The fob lock system 1 further includes a fob 8, shown in FIG. 2 which has a transmitter 14 configured to send the first signal to the first sensor 6 located on the tubular housing 2 to either lock or unlock the opposing legs 3A and 3B when the fob 8 is six feet away from the tubular housing 2. The fob 8 is also equipped with a powerful magnet 15 allowing it to be placed on a metal surface and a hole 9 allowing it to attach to a keyring.

Figure 4:
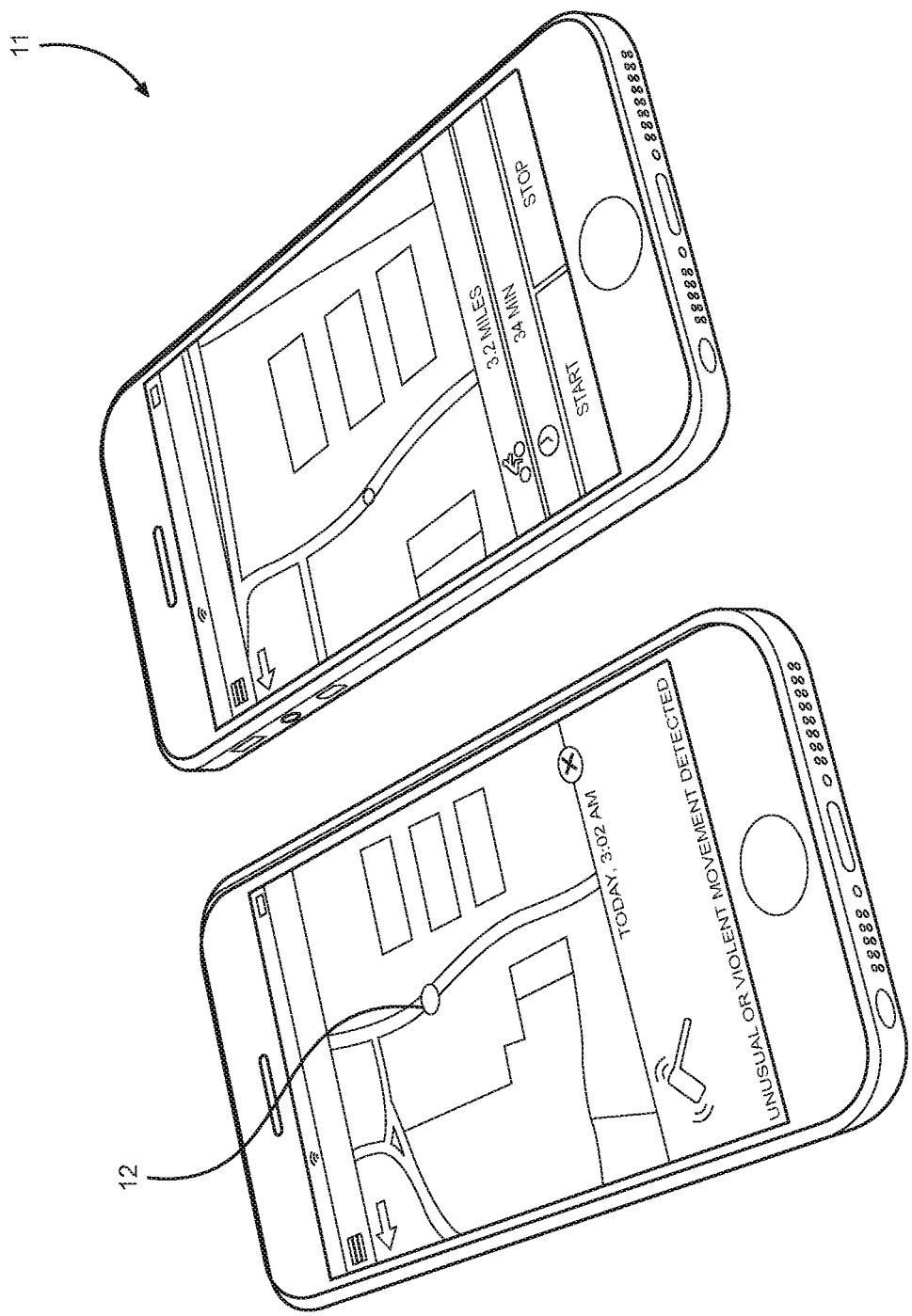
FIG. 4 is a perspective view illustrating a cell phone face showing a tracking application that can be used with the present invention of FIG. 1.

The fob lock system 1 further includes a surface detection sensor 16 as seen in FIG. 1 which is configured to be permanently secured to the handlebars 13 of a bicycle by conventional securing means. Through a cell phone app 12, a GPS tracker can be used in communication with the surface detection sensor 16, letting the owner know the location of bicycle at all times and if there is any activity nearby as shown in FIG. 4. In addition, the owner is able to view how many miles are ridden each day, also through the app. In the event of a security threat, the user is rapidly notified via text message to a cell phone 11. The security system includes a feature for homes, locking automatically when the owner steps more than six ft. away, in the event they forget to do so.

Figure 5:
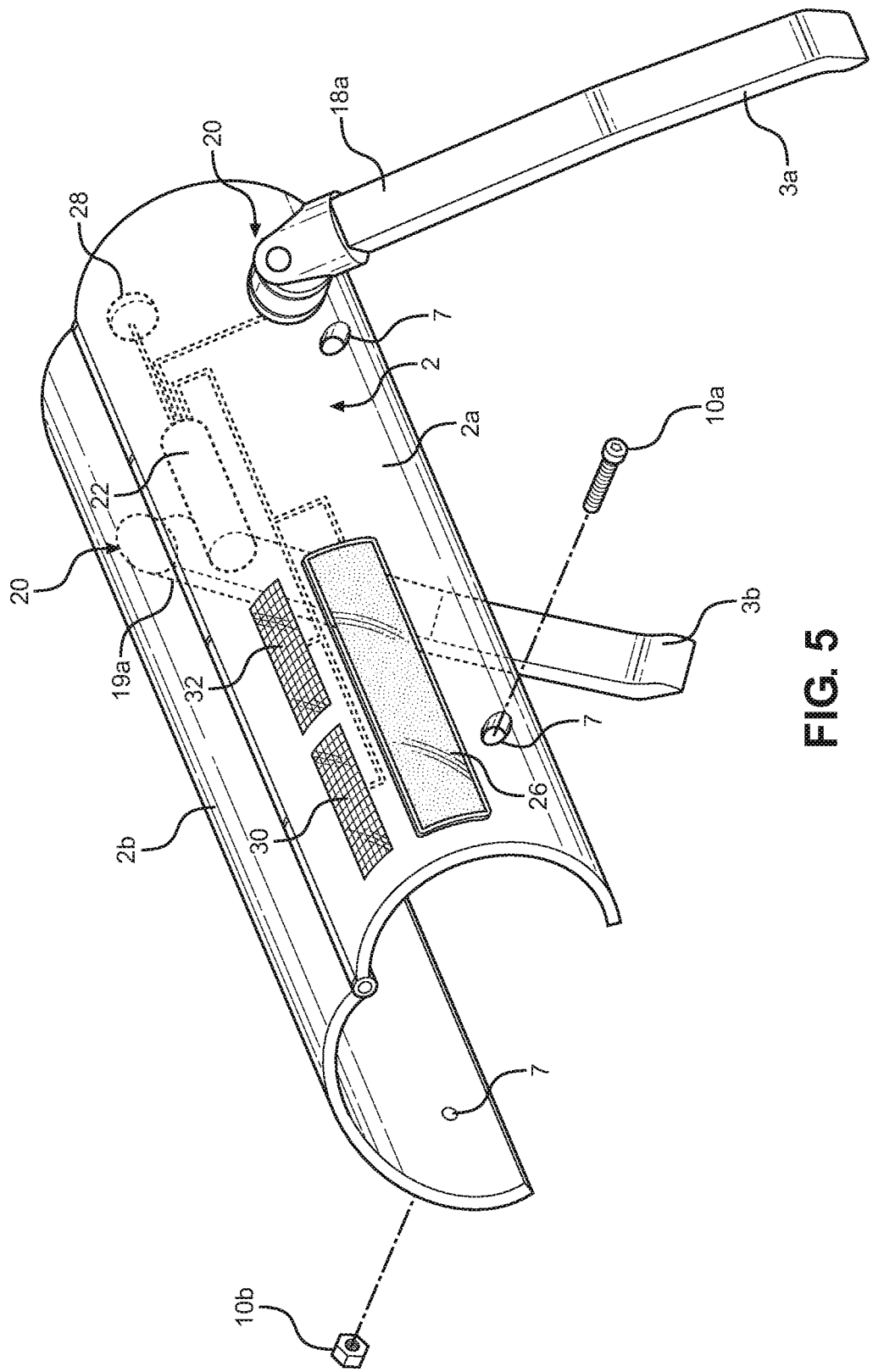
FIG. 5 is a perspective view of the tubular housing of the preferred embodiment of the Bicycle Security System according to an embodiment of the present invention.
Figure 6:
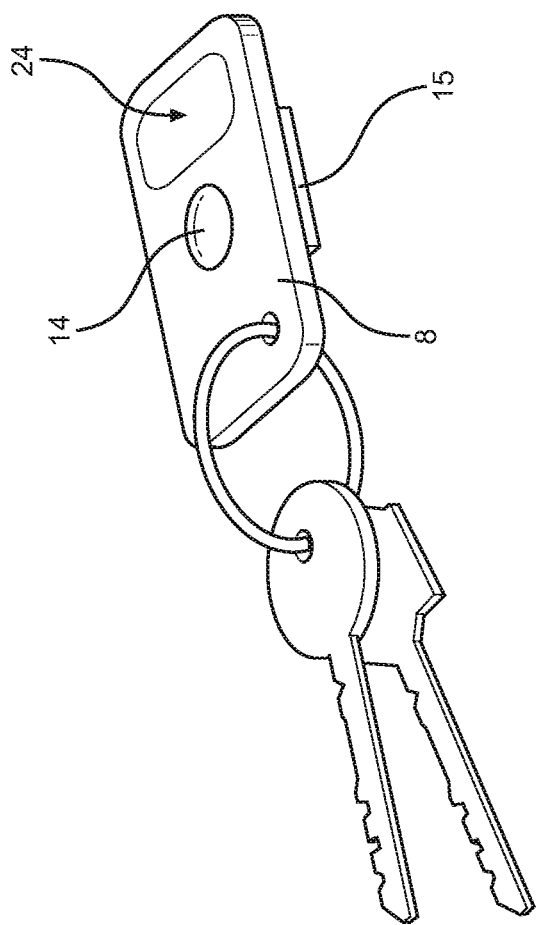
FIG. 6 is a perspective view illustrating a fob of the Bicycle Security System according to the preferred embodiment of the present invention of FIG. 5.

Features of the preferred embodiment of the instant invention is shown in FIGS. 5 and 6, wherein the tubular housing of the bicycle security system includes a first elongated half-tube 2a including at least one first connector member 10a, and a second elongated half-tube 2b including at least one second connector member 10b, wherein the at least one second connector member is adapted to releasably connect with the at least one first connector member. The second elongated half-tube is pivotally connected to the first elongated half-tube to form the tubular housing and be releasably locked upon the down tube 4 of the bicycle via the first and second connector members. Further, the first end of each opposing leg is movably attached to a respective one of said first and second elongated half-tubes via an electromechanical hinge. Further, a battery 22 is connected to one of the first and second elongated half-tubes and is electrically connected to and provides power to the electromechanical hinges. Further, the fob includes a control button 24 adapted to move the opposing legs between the locked and unlocked positions. Further, an electromagnet 26 is attached to one of the first and second elongated half-tubes and is electrically connected to the battery and is adapted to activate and attach to an adjacent metallic object when the fob is located a predetermined distance away from the first sensor. Further, a transceiver 28 is attached to one of said first and second elongated half-tubes and is electrically connected to the battery and is adapted to transmit and receive electronic signals from the cell phone to monitor the location of the bicycle and to remotely move the opposing legs between the locked and unlocked positions. And furthermore, a light-reflecting 30 emblem or a flashing light emitting member 32 connected to the battery may be employed upon one of said first and second elongated half-tubes for viewing at night for improved safety.

Further details include wherein the at least one first connector member may be formed as a threaded bolt 10a and the at least one second fastener may be formed as a threaded nut 10b.

Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A bicycle security system for use with a bicycle, said bicycle having a down tube, handlebars, and a front tire having adjacent spokes, said bicycle security system comprising:

a tubular housing configured to be secured to said down tube,
said tubular housing having:
  a first elongated half-tube including:
    at least one first connector member;
  a second elongated half-tube including:
    at least one second connector member;
      wherein said at least one second connector member is adapted to releasably connect with said at least one first connector member;
    wherein said second elongated half-tube is pivotally connected to said first elongated half-tube to form said tubular housing and be releasably locked upon said down tube of said bicycle via said first and second connector members;
  a pair of opposing legs having a first end and a second end and configured to be oriented in either a locked position or an unlocked position,
    wherein said first end of each said opposing leg is movably attached to a respective one of said first and second elongated half-tubes via an electromechanical hinge;
    wherein said second end of each said opposing leg includes an inturned hook adapted such that when in said locked position said pair of opposing legs can securely hold onto and removably connect said bicycle to a structure to prevent the theft of said bicycle; and
  a battery;
    wherein said battery is connected to one of said first and second elongated half-tubes and is electrically connected to and provides power to said electromechanical hinges and a first sensor;
said first sensor attached to said tubular housing and having a receiver configured to receive a first signal; wherein said first sensor is electrically connected to said electromechanical hinges of said opposing legs and is adapted to control the movement of said opposing legs from said locked and unlocked positions via said electromechanical hinges;
a fob having a transmitter configured to transmit said first signal to said first sensor; wherein said fob is adapted to be carried by person using said bicycle; and wherein when said fob is located a predetermined distance away from said first sensor the first sensor automatically moves said opposing legs to said locked position; and wherein said fob includes a control button thereon adapted to move said opposing legs between said locked and unlocked positions; and
a surface detection sensor configured to be secured to said handlebars for communicating with a cell phone security application to establish a location of said bicycle.

2. The bicycle security system of claim 1 wherein said at least one first connector member is formed as a threaded bolt; and said at least one second fastener is formed as a threaded nut.

3. The bicycle security system of claim 1 wherein said opposing legs are configured to move to said locked position when said fob is at least six feet from said first sensor.

4. The bicycle security system of claim 1 wherein said fob includes a magnet to allow a user to place said fob on a metal surface.

5. The bicycle security system of claim 1 wherein said fob includes a hole to receive a keyring.

6. The bicycle security system of claim 1 wherein said surface detection sensor is configured to be permanently attached to said handlebar of said bicycle.

7. The bicycle security system of claim 1 wherein one of said first and second elongated half-tubes includes an electromagnet attached thereto and electrically connected to said battery and adapted to activate and attach to an adjacent metallic object when said fob is located a predetermined distance away from said first sensor.

8. The bicycle security system of claim 1 wherein one of said first and second elongated half-tubes includes a transceiver attached thereto and electrically connected to said battery and adapted to transmit and receive electronic signals from an external control unit to monitor the location of said bicycle and to remotely move said opposing legs between said locked and unlocked positions.

9. The bicycle security system of claim 8 further comprising an external control unit adapted to transmit and receive electronic signals from said transceiver and monitor the location of said bicycle and to remotely move said opposing legs between said locked and unlocked positions.

10. The bicycle security system of claim 9 wherein said external control unit is formed as a cell phone including a computer application thereon adapted to monitor the location of said bicycle and to remotely move said opposing legs between said locked and unlocked positions.

11. The bicycle security system of claim 1 wherein one of said first and second elongated half-tubes includes a light-reflecting emblem thereon for viewing at night for improved safety.

12. The bicycle security system of claim 1 wherein one of said first and second elongated half-tubes includes a light member thereon electrically connected to said battery for viewing at night for improved safety.

13. The bicycle security system of claim 12 wherein said light member is adapted to flash on and off while a person is riding said bicycle.

\* \* \* \* \*